Aug. 17, 1937.     H. B. HULL     2,090,417
REFRIGERATING APPARATUS
Filed Feb. 14, 1936     5 Sheets-Sheet 3

INVENTOR.
HARRY B. HULL.
BY
HIS ATTORNEYS.

INVENTOR.
HARRY B. HULL.
BY
Spencer, Hardman and Fehr.
HIS ATTORNEYS.

Patented Aug. 17, 1937

2,090,417

UNITED STATES PATENT OFFICE 2,090,417

REFRIGERATING APPARATUS

Harry B. Hull, Dayton, Ohio, assignor to General Motors Corporation, Dayton, Ohio, a corporation of Delaware Application February 14, 1936, Serial No. 63,911

19 Claims. (Cl. 62—103)

This invention relates to refrigeration and particularly to refrigerating apparatus wherein the air within a refrigerated compartment thereof is conditioned.

It is well known that evaporators of mechanically refrigerated refrigerator cabinets, particularly of the household type are maintained at such low temperature that they withdraw moisture from the air within the food storage compartment thereof and from food products stored therein thus causing the foods to be dried and odors or flavors of certain foods to become mixed with other foods. I am aware that others have provided means for increasing the humidity or the moisture content of air within a food storage compartment of a mechanically refrigerated cabinet. For example water sprays, etc., have been provided within the food storage compartment of mechanically refrigerated cabinets for preventing food products stored therein from becoming dried out and for preventing odors and flavors of certain foods from mixing with and contaminating other foods. Of the constructions for this purpose known to me none can be considered portable refrigerators due to the necessity of providing permanent water pipe or conduit connections leading from the refrigerator cabinet to a drain located remote from the cabinet and from a source of water supply to the refrigerator cabinet.

An object of my invention is to provide a portable refrigerator cabinet with an apparatus for treating and conditioning air within the food storage compartment thereof.

Another object of my invention is to provide an improved mechanically refrigerated cabinet having means for increasing the moisture content of the air or maintaining a predetermined humidity within the food storage compartment thereof.

A further object of my invention is to provide an improved mechanically refrigerated cabinet having means for supplying moisture to the food storage compartment thereof without the necessity of having the moisture or water conducted through pipe connections with a water main and drain source remote from the cabinet and forming a permanent part of the building in which the refrigerator is located.

A still further object of my invention is to provide means for conveying drip water flowing from a cooling element mounted exteriorly of a mechanically refrigerated cabinet into the food storage compartment provided in the cabinet to treat or increase the moisture content of the air in a compartment and to provide means for conveying excess water from the food compartment to the exterior thereof and to evaporate the removed water.

It is a still further and more specific object of my invention to provide a refrigerating apparatus of the type described in the foregoing objects in which a closed refrigerant circulating system associated with the refrigerator cabinet is detachably attached to the cabinet and is bodily removable from the cabinet as a unit.

Further objects and advantages of the present invention will be apparent from the following description, reference being had to the accompanying drawings, wherein a preferred form of the present invention is clearly shown.

Figure 1:
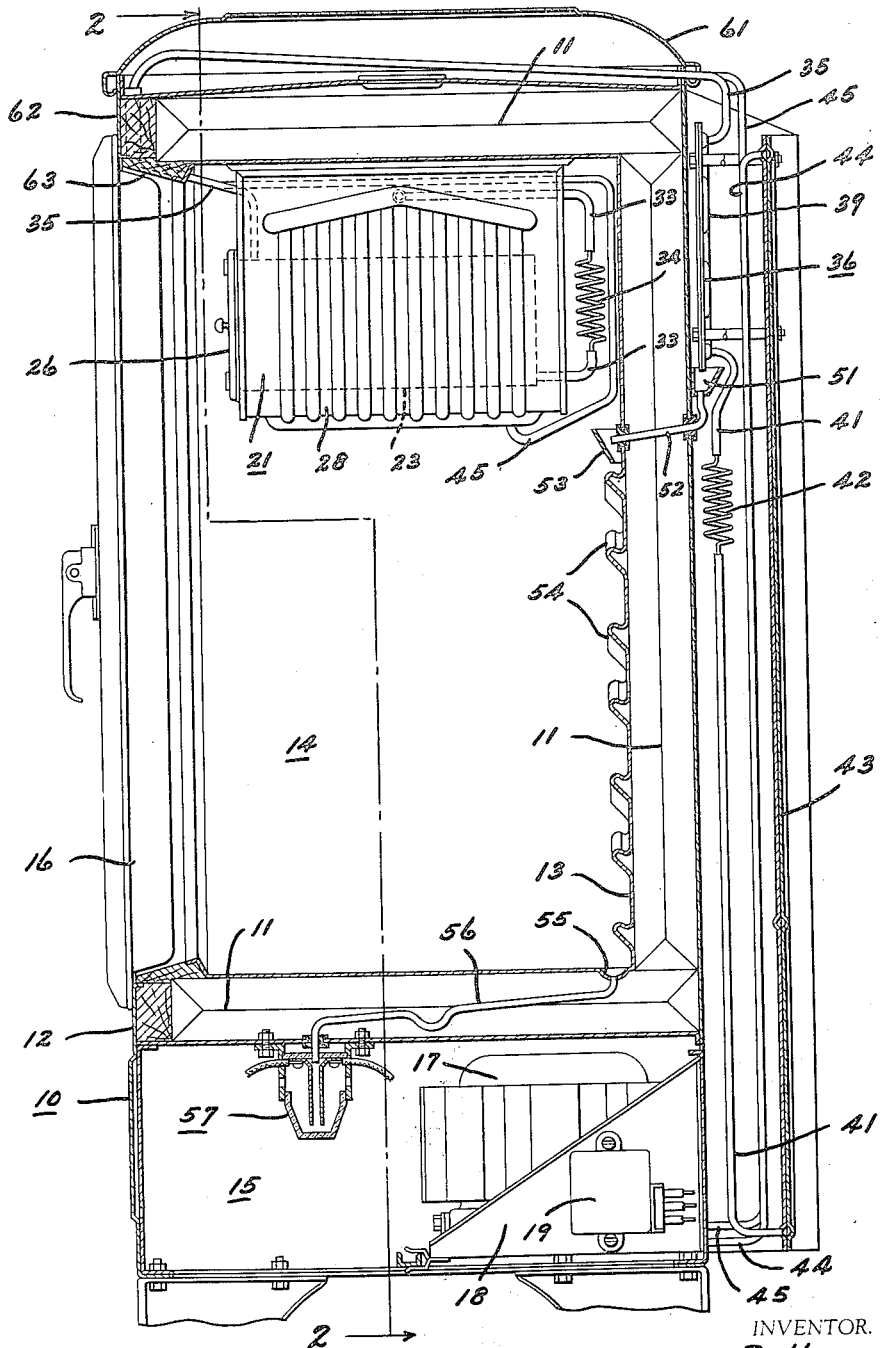
Fig. 1 is a vertical sectional view through a mechanically refrigerated cabinet having my invention embodied therein.
Figure 3:
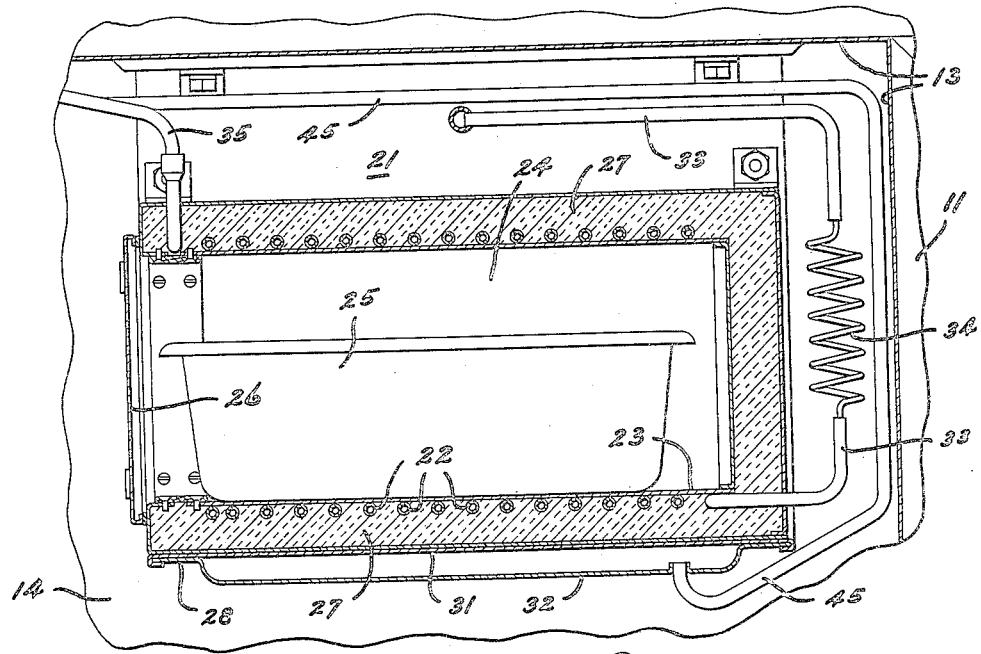
Fig. 3 is a fragmentary vertical sectional view of a part of the refrigerating apparatus and is taken on the line 3—3 of Fig. 2.
Figure 4:
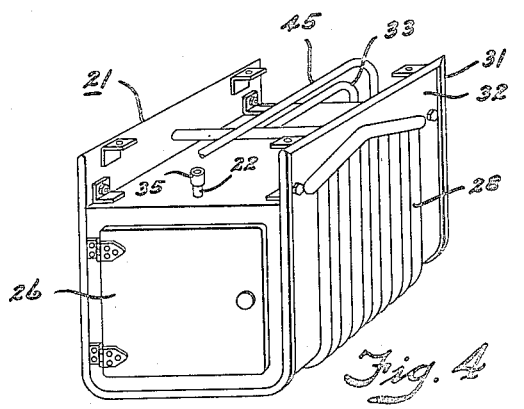
Fig. 4 is a perspective view of a cooling element structure employed in the apparatus disclosed in Fig. 1.
Figure 5:
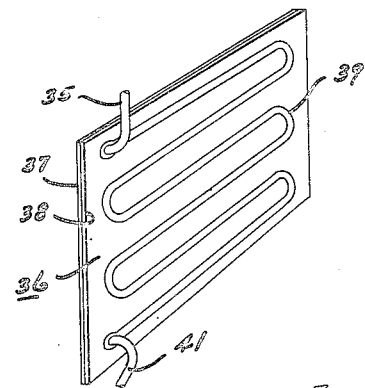
Fig. 5 is a perspective view of another cooling element employed in the apparatus disclosed in Fig. 1.

Referring to the drawings, for the purpose of illustrating my invention, I have shown in Fig. 1 thereof a refrigerator cabinet of the portable household type which can be moved from one locality to another by simply disconnecting the electrical wires or cords leading thereto and which is generally represented by the reference character 10. Cabinet 10 includes a plurality of insulated walls 11 supported by a metal shell or a plurality of metal panels 12 which form the exterior finish surface of cabinet 10. The walls 11 are lined with a metal member 13 which forms a food storage chamber 14 in cabinet 10. The chamber 14 may have a plurality of superimposed horizontally extending food supporting shelves (not shown) disposed therein for dividing the chamber into a plurality of food storage compartments or food supporting surfaces. The metal shell or panels 12 extend beyond the lowermost portion of chamber 14 to form walls of a machine compartment 15 below the insulated food chamber and in which compartment a compressor of a refrigerant liquefying and circulating unit of a closed refrigerating system is mounted. The chamber 14 is provided with the usual access opening adapted to be closed by the door 16. The closed refrigerating system associated with or attached to cabinet 10 comprises a motor-compressor element 17 secured to a removable frame-like structure 18 which is disposed or mounted within compartment 15 in any suitable or well-known manner. The motor of element 17 has suitable connections, through a juncture box 19, with an electric circuit. The motor-compressor element 17 may be of the continuous operating type or if desired the juncture box 19 may house a switch for controlling the electric circuit leading to the electric motor of element 17, to cyclically operate the motor-compressor element, and this switch may be actuated in response to the temperature within the food chamber 14 in any suitable and well-known manner. A unitary element or structure generally represented by the reference character 21 is mounted within the food storage chamber 14. The structure 21 includes a refrigerant evaporating coil or portion 22 (see Fig. 3) surrounding and secured in intimate thermal contact with a metal receptacle 23 forming a compartment 24 for the reception of an ice tray or trays 25 adapted to contain substance to be congealed or frozen. The compartment 24 has a door 26 closing the access opening thereto and which door prevents air circulating within food compartment 14 from entering the low temperature or freezing compartment 24. The refrigerant expansion coil 22 and the freezing compartment 24 of the structure 21 are surrounded by or enclosed in suitable insulating material 27. A refrigerant expansion or evaporating portion 28, comprising superimposed sheet metal portions 31 and 32 having certain parts thereof spaced apart and certain other parts thereof secured together to provide a plurality of refrigerant passages therebetween, surrounds the insulation 27 and the refrigerant coil 22. The refrigerant expansion passage or passages within the sheet metal evaporator portion 28 of the structure 21 are connected to the refrigerant coil 22 by a conduit 33 having an expansion device such as the fixed restrictor 34 interposed therein. The refrigerant expansion coil 22 within structure 21 has a conduit 35 connecting same with another evaporator generally represented by the reference character 36, comprising superimposed sheet metal portions 37 and 38 (see Fig. 5) having certain parts thereof spaced apart and certain other parts thereof secured together to provide a refrigerant expansion passage 39 therebetween, and mounted exteriorly of cabinet 10 preferably along the back wall thereof (see Fig. 1). In the present disclosure the evaporator 36 is mounted in spaced relation to the condenser of the refrigerating system by suitable brackets or the like attached to the condenser for a purpose which will become apparent hereinafter. The refrigerant passage 39 within evaporator 36 is connected by a conduit 41, having an expansion device such as the fixed restrictor 42 interposed therein, to the lower portion of a condenser 43 preferably of the superimposed sheet metal variety now well known to those skilled in the art. The condenser 43 may be permanently secured in any suitable manner to the frame-like structure 18 and detachably secured to cabinet 10. Thus the condenser forms a part of the frame structure 18 and is removable from the cabinet along with this frame and with the element 17 mounted thereon. The upper portion of condenser 43 has a conduit or pipe connection 44 with the compressor portion of the motor-compressor element 17. The compressor portion of the motor-compressor element 17 also has another conduit or pipe 45 communicating therewith and connected to the refrigerant passages of the evaporator portion 28 of structure 21.

Operation of the electric motor within element 17 and consequently the compressor directly connected thereto and forming a part of the element causes the compressor to withdraw evaporated or gaseous refrigerant from the evaporator portion 28 of the unitary structure 21 through conduit 45. The compressor compresses the vaporized refrigerant and forces same under pressure through conduit 44, into the condenser 43 where it is cooled and liquefied in any suitable and well-known manner. The liquid refrigerant is stored in the condenser 43 prior to its flow through the pipe 41 to restrictor 42 and into the refrigerant expansion passage 39 of evaporator 36. The refrigerant flows from evaporator 36 through the pipe 35 into the refrigerant expansion coil 22. Refrigerant then flows through pipe or conduit 33 to restrictor 34 and into the refrigerant expansion portion 28 of the structure 21. The refrigerant vaporized in its passage through the evaporator elements 36, 22 and 28 is then drawn back into the compressor portion of element 17 for recirculation through the system as described. The restrictor 42 causes a partial evaporation of refrigerant as it flows into and through evaporator 36 thus permitting further evaporation thereof as it flows into and through the refrigerant expansion coil 22 of the structure 21. The other restrictor 34 cooperates with restrictor 42 to maintain a predetermined pressure of refrigerant in the system between evaporator 36 and evaporator portion 28 to thus permit further and complete expansion or vaporization of the refrigerant as it flows into and through the refrigerant passages of the evaporator portion 28 provided in the structure 21. Obviously therefore evaporator 36 and the refrigerant coils 22 will be maintained at a lower temperature than the evaporator portion 28 of structure 21. The low temperature of the refrigerant coils 22 is utilized for cooling the interior of the freezing compartment 24 of structure 21 and the relatively higher temperature within evaporator portion 28 is utilized for cooling and causing circulation of air within the food storage chamber 4. The low temperature of evaporator 36 is utilized for a purpose to be presently fully described.

By referring again to Fig. 1 of the drawings it will be noted that I mount a trough-like device 51 on the back wall of cabinet 10 below the evaporator 36. Leading from the trough 51, through suitable grommets, there is a pipe 52 which extends through the back wall of cabinet 10 into the food chamber 14. The free end of pipe 52 terminates within a funnel-like element 53 secured to the wall 13. I provide a plurality of vertically arranged corrugations 54 along the back wall of liner member 13 and a cup-like depression 55 in the bottom wall thereof. The corrugations 54 form a plurality of troughs which alternately slope at an angle toward one another to provide an extended path of flow for water to be conveyed into chamber 14 and exposed to air therein. A pipe or conduit 56 is secured to the lower wall portion of depression 55 and extends through the bottom wall of chamber 14 to the exterior thereof and into a drip water disposing means generally represented by the reference character 57. This water disposing means is preferably of the type fully disclosed in the patent to Richard S. Gaugler, No. 2,016,368 of October 8, 1935 and which means causes evaporation of water flowing therein to atmosphere exteriorly of the food chamber 14.

The refrigerating effect produced by evaporator 36 cools air in the vicinity thereof exteriorly of cabinet 10 and the food compartment 14 and causes moisture to be withdrawn from the air and to condense or be precipitated on the cooling surfaces of the evaporator. This condensed moisture flows in the form of drip water into trough 51 and is conducted away from the trough by the pipe 52 and conveyed into the food storage chamber 14. The drip water flows from the funnel-like device 53 into the uppermost trough provided by the plurality of corrugations 54. The water then flows from the upper trough progressively down along the back wall of liner 13 through other of the troughs provided by the corrugations 54 into the sump or cup-like depression 55. This water adds moisture to the air and food within the food storage chamber 14. The refrigerating effect produced by evaporator portion 28 of the structure 21 is normally and essentially of such a low temperature to cause moisture to be withdrawn from the air within chamber 14 and from food stored therein and deposited or precipitated upon the cooling surfaces of the evaporator portion 28. By rehumidifying the air within chamber 14 or by increasing the moisture content thereof through absorption of the water conveyed into the chamber in the manner described foods stored in the chamber 14 are prevented from being dried out. At certain times during the operation of the apparatus an excess amount of water may be conducted through the compartment 14 from the exterior of cabinet 10 and this excess water is conveyed from the sump or depression 55, by pipe 56, into the water evaporating means 57. The evaporating means 57 includes two spaced apart electrodes which, when bridged by water flowing into the means, causes an electric current to flow between the electrodes through the water to thus heat the water and evaporate same out of the means 57 into the atmosphere exteriorly of chamber 14. Water removed from the dissipating means 57 is distilled to thus remove the contaminating odors or flavors therefrom and to insure purification thereof prior to recondensation or reprecipitation on the cooling surfaces of evaporator 36. The arrangement of the evaporators 36, 22 and 28 and the restrictors 42 and 34 in the closed refrigerating system permits a very low temperature to be maintained within the insulated compartment 24 for quickly freezing substance contained in the tray 25 and permits the evaporator portion 28 of the structure 21 to be maintained at a sufficiently low temperature to properly refrigerate and preserve food products stored within chamber 14. The refrigerating apparatus disclosed is constructed and arranged to meet substantially all requirements of present-day food storage or preservation. For example, the household refrigerator cabinet 10 is provided with means for quickly freezing water into ice blocks, has means for refrigerating the chamber 14 to any desired temperature for cooling food products or other articles such as bottled beverages and has means for increasing the moisture content of air circulated within compartment 14 by evaporator 28 or for increasing the humidity within the chamber 14. It is apparent that all of these provisions are made in my improved apparatus without the necessity of conveying water through pipes or conduits extending from a water main and from a drain source remote from the cabinet and forming a permanent part of the building in which the refrigerator is located. All these provisions are incorporated in the refrigerator cabinet construction itself thus the apparatus is of the so-called portable type which can be readily moved as a unit from one locality to another.

Figure 2:
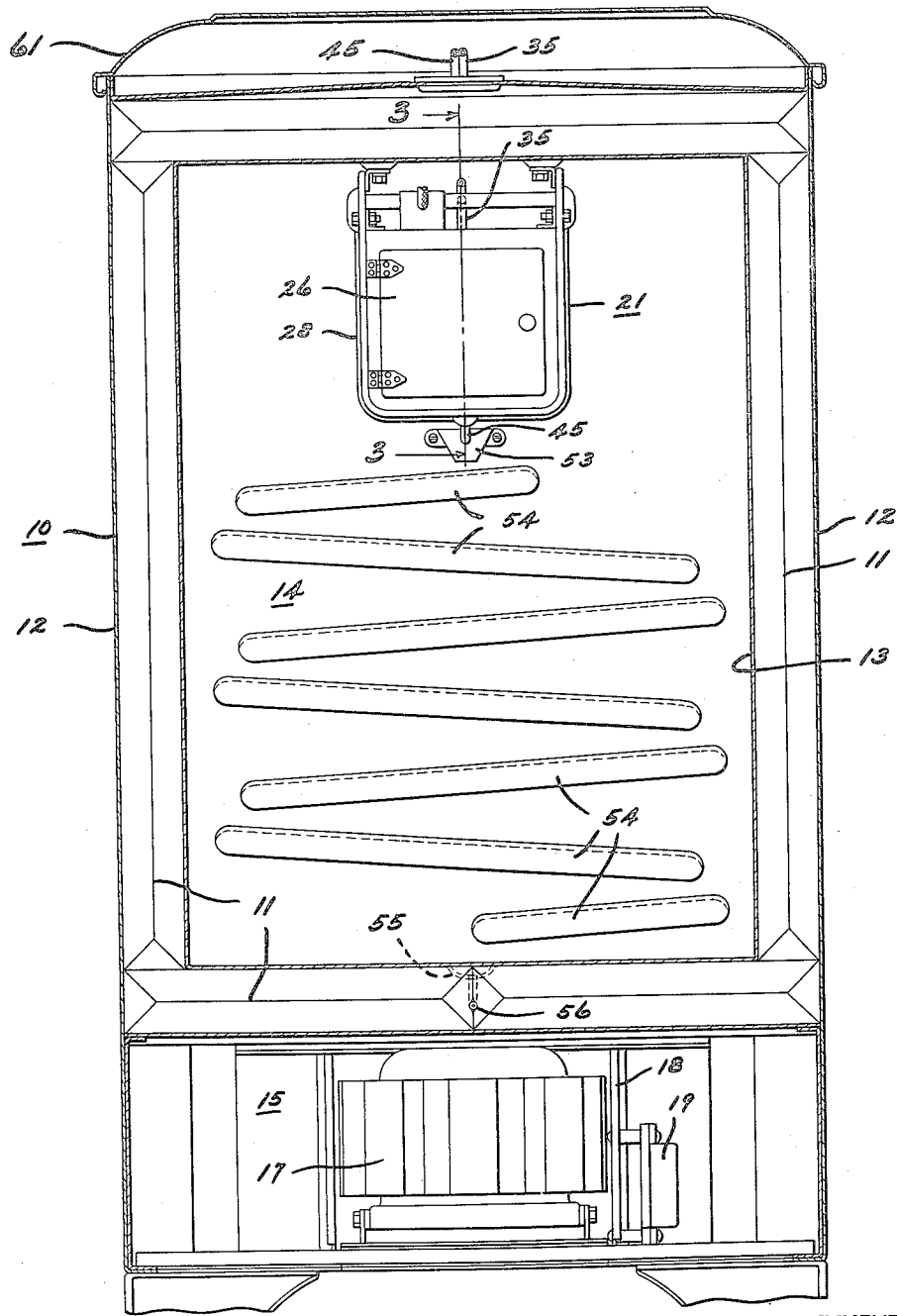
Fig. 2 is a vertical sectional view of the refrigerating apparatus disclosed in Fig. 1 and taken on the line 2—2 thereof.
Figure 6:
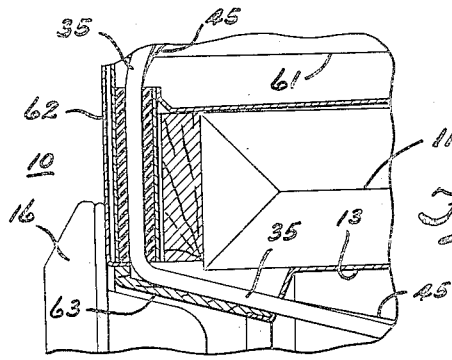
Fig. 6 is an enlarged fragmentary sectional view of an upper front portion of the refrigerator cabinet disclosed in Fig. 1 showing the extension of refrigerant conduits through the front wall of the cabinet.

The improved apparatus disclosed in Figs. 1 and 2 of the drawings is of the type wherein the refrigerating system associated with or mounted in cabinet 10 is removable from the cabinet as a unitary structure or as a closed system. By mounting the motor-compressor element 17 on the frame-like structure 18, by mounting or attaching the condenser 43 on the frame structure 18, by mounting the evaporator 36 on the upper portion of condenser 43, and by extending the refrigerant conveying pipes 35 and 45 over the sub-top of cabinet 10 and under a removable finished top panel 61 and through the insulated top wall at the front thereof, behind a removable panel or plate 62 and a removable door opening frame finish molding or breaker strip 63 (see Fig. 6) to the structure 21, the structure 21 can be detached from the top wall of liner member 13 and moved outwardly of compartment 14 and over the top of cabinet 10 along with removal or detachment of the condenser 43, evaporator 36 and elements 17 and 18 from the cabinet 10. The construction and arrangement of an apparatus to permit removability of the closed refrigerating system, in the manner herein briefly described, as a unit from cabinet 10 has been practiced before and is well known to those skilled in the art. However, if a more complete and detailed description of the structure at the front of the cabinet, which permits removal of the refrigerant pipes from the cabinet while being connected to the compressor and evaporators, is necessary the copending application of Edmund F. Schweller, Serial No. 24,370 filed May 31, 1935, wherein such structure is fully described, should be referred to.

Figure 7:
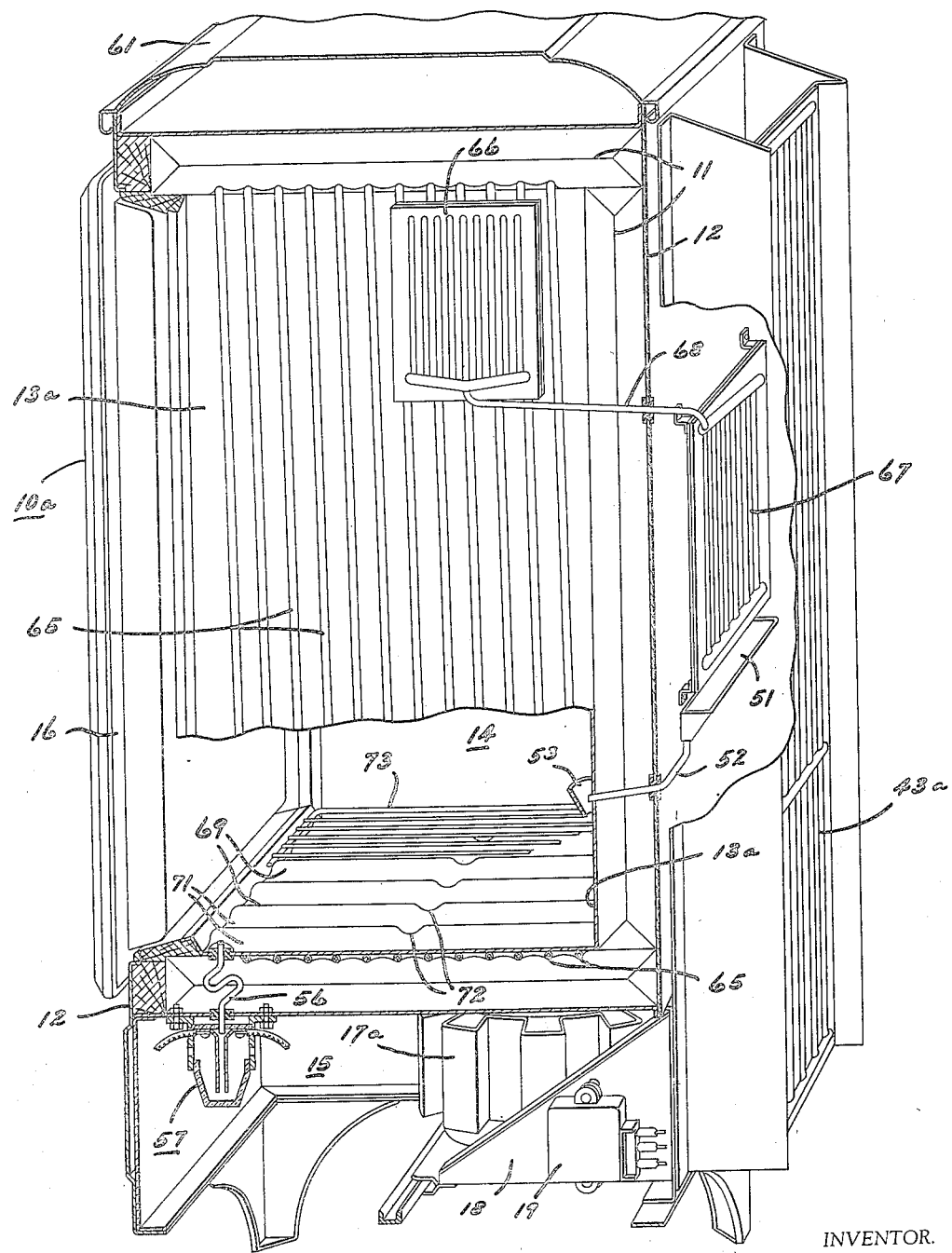
Fig. 7 is a view in perspective partly in section and partly in elevation showing a modified form of apparatus having my invention embodied therein.

Referring now to Fig. 7 of the drawings, wherein I have disclosed a modified form of my invention, it will be noted that the cabinet 10a is similar to cabinet 10 but in this modified showing a conventional closed primary refrigerating system, including a motor-compressor unit 17a, a condenser 43a and an evaporator 65, is associated with the cabinet. The evaporator 65 is, however, formed of a plurality of turns or loops of conduit which are wrapped around the walls of the compartment liner member 13a and secured in intimate thermal contact therewith in any suitable or desirable manner. In this modified apparatus a closed secondary refrigerating system, comprising a condenser 66, an evaporator 67, both of which are preferably of the superimposed sheet metal type, and a suitable conduit connection or connections 68 establishing communication between the condenser 66 and evaporator 67, is provided. The condenser 66 of the secondary refrigerating system is mounted in any suitable or desirable manner in intimate thermal contact with the evaporator coils 65 of the primary refrigerating system. The evaporator 67 of this secondary refrigerating system is mounted exteriorly of the food storage chamber 14 and preferably on and in spaced relation to the back wall of cabinet 10a. The liner member 13a has a plurality of corrugations 69 formed therein and providing a plurality of troughs 71 extending at right angles to the front and back walls of cabinet 10a. Each corrugation 69 has a small indentation 72 provided in the apex thereof. The bottoms of the indentations 72 are spaced from the bottoms of the troughs 71 so that the troughs will hold a body of liquid up to a predetermined level. The indentations 72 permit the liquid to flow from one trough 71 to others of the plurality thereof when the level of liquid reaches above the bottom of the indentations so as to distribute the liquid substantially uniformly over the entire bottom wall of chamber 14. A shelf 73 may be placed on top of the corrugations 69 and supported thereby for providing a flat food supporting surface along the bottom wall of chamber 14. The drip water disposing or evaporating means 57 in this modified form of the invention communicates, through pipe 56, with one of the troughs 71. If desired an enclosed or insulated cooling element may be connected with the evaporator coils 65 and mounted within the chamber 14 of cabinet 10a for the reception of trays containing a substance to be congealed or frozen.

In the showing of the modified form of apparatus disclosed in Fig. 7 of the drawings the primary refrigerating system functions to cause a refrigerating effect to be produced by the evaporator coils 65 for cooling the metal liner member 13a and consequently the interior of compartment 14 for chilling food stored in the compartments. The cooling of the walls 13a of compartment 14 may cause dehydration or dehumidification of air within the compartment 14 and consequently food stored therein. In order to provide for increasing the moisture content of the air and foods within compartment 14 of the modified apparatus in a manner similar to that disclosed relative to the apparatus disclosed in Figs. 1 and 2 of the drawings the secondary refrigerating system is employed. The refrigerating effect produced in the coils 65 of the evaporator of the primary refrigerating system cools and causes a volatile fluid sealed within the secondary refrigerating system to condense within the condenser 66. The condensed volatile liquid refrigerant flows through pipe 68 into the evaporator 67 where it absorbs heat from air in the vicinity thereof and vaporizes and returns to the condenser 66. The cooling effect produced by vaporization of refrigerant within evaporator 67 of the secondary refrigerant system causes moisture to be withdrawn from air exteriorly of cabinet 10a and to condense or precipitate on the cooling surface of the evaporator 67. The moisture flows in the form of drip water from evaporator 67 into the trough 51 and from the trough 51, through conduit 52, down along the back wall of compartment 14 into the plurality of troughs 71 provided in the bottom wall of the compartment. The water along the bottom wall of compartment 14 may flow through the depressions 72 in the corrugations 69 to the plurality of troughs 71. The open end of pipe 56 is spaced from the bottom of one of the troughs 71 to permit a predetermined thickness of a body of the water to be maintained within the troughs 71. In case water flowing into the trough 71 overflows into pipe 56 it is conveyed thereby into the water disposing or evaporating means 57 where it is dissipated or vaporized into the atmosphere exteriorly of the refrigerated chamber 14. Obviously therefore my novel improvement is not limited to the specific construction shown in Figs. 1 and 2 of the drawings because other modifications such as that disclosed in Fig. 7 of the drawings are well within the realm of the invention.

It is also to be understood that my invention is not limited to the particular arrangement and interconnections between the elements of the refrigerating system as shown and described in referring to the apparatus disclosed in Figs. 1 and 2 of the drawings. Other arrangements and interconnections between the elements of a refrigerating system may be made for carrying out the objects of the invention. For example, I have shown in Figs. 8 to 11 inclusive of the drawings other arrangements and interconnections between the elements of refrigerating systems capable of functioning to produce the desired results.

Figure 8:
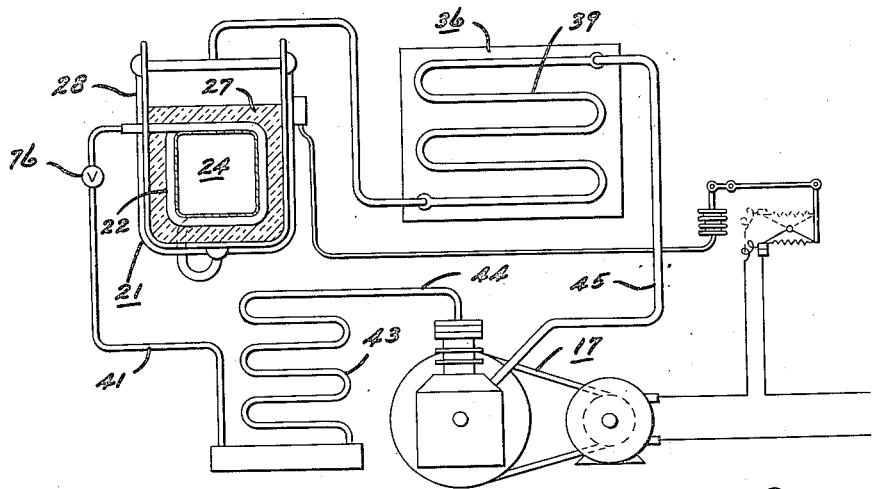
Fig. 8 is a diagrammatic view of a modified form of refrigerating system suitable for use in the present invention.
Figure 9:
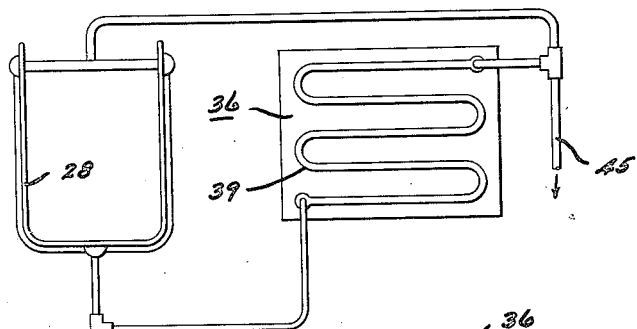
Fig. 9 is a diagrammatic view of a part of a modified form of refrigerating system.
Figure 10:
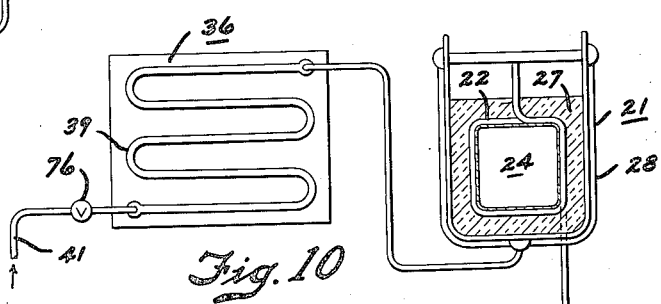
Fig. 10 is a diagrammatic showing of a part of another modified form of refrigerating system.
Figure 11:
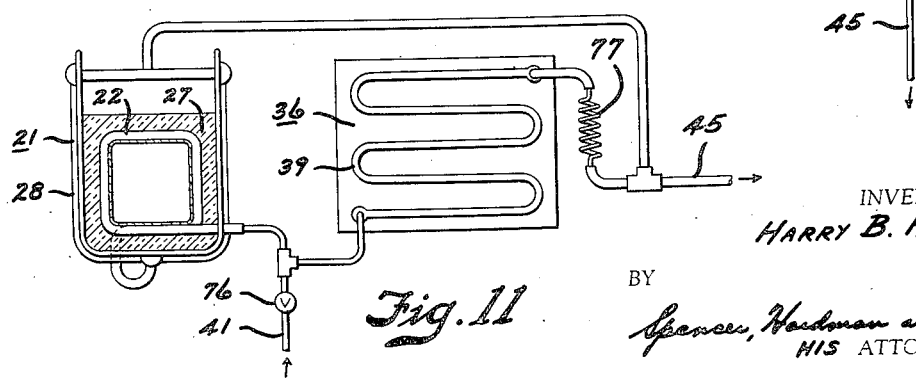
Fig. 11 is a diagrammatic showing of a part of a still further modified form of refrigerating system.

Referring now to Fig. 8 of the drawings it will be noted that, instead of circulating condensed or liquid refrigerant first to the evaporator 36 as described relative to the apparatus disclosed in Figs. 1 and 2, liquid refrigerant is first circulated to the low temperature or freezing coils 22 of the refrigerating system, under control of an expansion valve 76, and from coils 22 to the refrigerant evaporator portion 28 of the structure 21 thence to the evaporator 36 and back to the compressor. Referring to Fig. 9 it will be observed that evaporator 36 is connected in parallel circuit relation with evaporator 28 and that the freezing coils 22 have been omitted from this system and the liquid refrigerant therefore flows simultaneously to evaporator portion 28 and to evaporator 36 under control of the expansion valve 76 in this modified showing. In Fig. 10 liquid refrigerant first flows to evaporator 36, under control of the expansion valve 76, thence to evaporator portion 28 of the structure 21 and then to the coils 22 and back to the compressor. In the hook-up of the refrigerating system disclosed in Fig. 11, it will be noted that the evaporator 36 and the coils 22 of the structure 21 are connected in parallel circuit relation with one another and that liquid refrigerant flows simultaneously to evaporator 36 and to the refrigerant coils 22 under the control of valve 76. Refrigerant leaving coils 22 is conveyed through the evaporator portion 28 of the structure 21 and communicates with the conduit or pipe 45 which leads to the compressor between the compressor and a suitable restrictor 77. The restrictor 77 limits the amount of refrigerant to be withdrawn from evaporator 36 and therefore this restrictor tends to maintain evaporator 36 at a predetermined temperature. All of the various arrangements and interconnections between the evaporators of refrigerating systems disclosed in Figs. 8 to 11 inclusive and the different functions or results afforded by the various arrangements are well known to those skilled in the art and need no detailed explanation herein.

From the foregoing it will be seen that I have provided an improved refrigerating apparatus wherein air within the food storage compartment thereof is treated or maintained at a predetermined moisture content for the purpose of preventing drying of food and transference of odors and flavors from certain food products to certain other foods stored in the refrigerated compartment to thereby prevent contamination thereof. My invention permits the use of devices for treating air within refrigerated food storage compartments of mechanically refrigerated portable apparatus and provides an apparatus which is entirely automatic in function thus eliminating the necessity of watching and replenishing the water supply essential in increasing the moisture content of the refrigerated compartment. My improved apparatus is not only automatic in its function of supplying fresh uncontaminated moisture to the food chamber or of increasing the moisture content of air therein but is also automatic in its function of conveying the contaminated moisture out of the food storage compartment of the apparatus where it is prevented from re-entering the food storage chamber by being evaporated into the atmosphere exteriorly of the chamber. The improved apparatus effectively meets substantially all the demands of present-day refrigeration requirements as herein set forth and in addition, provides a portable refrigerating apparatus in which all the elements of the refrigerating system thereof is removable as a unit or as a closed system from the refrigerator cabinet.

While the forms of embodiment of the invention as herein disclosed, constitute preferred forms, it is to be understood that other forms might be adopted, all coming within the scope of the claims which follow.

What is claimed is as follows:

1. A refrigerating apparatus comprising in combination, a cabinet having a food storage chamber provided therein, means for chilling and causing circulation of air within said food chamber, means for precipitating moisture from air exteriorly of said cabinet, and means for conducting the moisture precipitated from air exteriorly of the cabinet by said second named means into said food chamber for absorption by the air circulating within the chamber.

2. A refrigerating apparatus comprising in combination, a cabinet having a food storage chamber provided therein, means for chilling and causing circulation of air within said food chamber, means for precipitating moisture from air exteriorly of said cabinet, means for conducting the moisture precipitated from air exteriorly of the cabinet by said second named means into said food chamber for absorption by the air circulating within the chamber, and means for removing excess moisture from the food chamber.

3. A refrigerating apparatus comprising in combination, a cabinet having a food storage chamber provided therein, means for chilling and causing circulation of air within said food chamber, means for precipitating moisture from air exteriorly of said cabinet, means for conducting the moisture precipitated from air exteriorly of the cabinet by said second named means into said food chamber for absorption by the air circulating within the chamber, means for removing excess moisture from the food chamber, and means for evaporating the excess moisture removed from said food chamber into the atmosphere exteriorly of said food chamber.

4. In a portable refrigerator, a cabinet having a chamber formed therein, refrigerant circulating means associated with said cabinet and including a plurality of cooling elements, one of said plurality of cooling elements being disposed within said chamber and adapted to cool and cause circulation of air therein, another of said plurality of cooling elements being mounted outside of said chamber and adapted to precipitate moisture from air exteriorly of the chamber, and means for conducting the moisture precipitated from air exteriorly of the chamber into said chamber for absorption by the air circulating within the chamber.

5. In a portable refrigerator, a cabinet having a chamber formed therein, refrigerant circulating means associated with said cabinet and including a plurality of cooling elements, one of said plurality of cooling elements being disposed within said chamber and adapted to cool and cause circulation of air therein, another of said plurality of cooling elements being mounted outside of said chamber and adapted to precipitate moisture from air exteriorly of the chamber, means for conducting the moisture precipitated from air exteriorly of the chamber into said chamber for absorption by the air circulating within the chamber, and said refrigerant circulating means including said cooling elements being removable from said cabinet as a closed system.

6. In a portable refrigerator, a cabinet having a chamber formed therein, refrigerant circulating means associated with said cabinet and including a plurality of cooling elements, one of said plurality of cooling elements being disposed within said chamber and adapted to cool and cause circulation of air therein, another of said plurality of cooling elements being disposed within said chamber and insulated from the air circulated therein by said one of said cooling elements to provide a compartment adapted to receive a substance to be congealed or frozen, still another of said plurality of cooling elements being mounted outside of said chamber and adapted to precipitate moisture from air exteriorly of the chamber, and means for conducting the moisture precipitated from air exteriorly of the chamber into said chamber for absorption by the air circulating within the chamber.

7. In a portable refrigerator, a cabinet having a chamber formed therein, refrigerant circulating means associated with said cabinet and including a plurality of cooling elements, one of said plurality of cooling elements being disposed within said chamber and adapted to cool and cause circulation of air therein, another of said plurality of cooling elements being disposed within said chamber and insulated from the air circulated therein by said one of said cooling elements to provide a compartment adapted to receive a substance to be congealed or frozen, still another of said plurality of cooling elements being mounted outside of said chamber and adapted to precipitate moisture from air exteriorly of the chamber, means for conducting the moisture precipitated from air exteriorly of the chamber into said chamber for absorption by the air circulating within the chamber, and said refrigerant circulating means including said cooling elements being removable from said cabinet as a closed system.

8. A refrigerating apparatus comprising in combination, a cabinet having a food storage chamber provided therein, an evaporator of a primary refrigerating system associated with said chamber for cooling and causing circulation of air therein, a condenser of a closed secondary refrigerating system disposed in intimate heat exchange relationship with the evaporator of said primary refrigerating system, said condenser being in communication with an evaporator forming part of said secondary refrigerating system, said evaporator of said secondary refrigerating system being disposed outside of said chamber and adapted to precipitate moisture from air exteriorly of the chamber, and means for conducting the moisture precipitated from air exteriorly of the food chamber by the evaporator of the secondary refrigerating system into said chamber for absorption by the air circulating within the chamber.

9. A refrigerating apparatus comprising in combination, a cabinet having a food storage chamber provided therein, an evaporator of a primary refrigerating system associated with said chamber for cooling and causing circulation of air therein, a condenser of a closed secondary refrigerating system disposed in intimate heat exchange relationship with the evaporator of said primary refrigerating system, said condenser being in communication with an evaporator forming part of said secondary refrigerating system, said evaporator of said secondary refrigerating system being disposed outside of said chamber and adapted to precipitate moisture from air exteriorly of the chamber, means for conducting the moisture precipitated from air exteriorly of the food chamber by the evaporator of the secondary refrigerating system into said chamber for absorption by the air circulating within the chamber, and means for removing excess moisture from the food chamber.

10. A refrigerating apparatus comprising in combination, a cabinet having a food storage chamber provided therein, an evaporator of a primary refrigerating system associated with said chamber for cooling and causing circulation of air therein, a condenser of a closed secondary refrigerating system disposed in intimate heat exchange relationship with the evaporator of said primary refrigerating system, said condenser being in communication with an evaporator forming part of said secondary refrigerating system, said evaporator of said secondary refrigerating system being disposed outside of said chamber and adapted to precipitate moisture from air exteriorly of the chamber, means for conducting the moisture precipitated from air exteriorly of the food chamber by the evaporator of the secondary refrigerating system into said chamber for absorption by the air circulating within the chamber, means for removing excess moisture from the food chamber, and means for evaporating the excess moisture removed from said food chamber into the atmosphere exteriorly of said food chamber.

11. A refrigerating apparatus comprising in combination, a cabinet having a lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, and means forming an extended path of flow for the moisture conducted into the chamber, said moisture path of flow being exposed to circulating air within the food chamber and arranged to present the moisture for absorption by the circulating air.

12. A refrigerating apparatus comprising, in combination, a cabinet having a lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, means forming an extended path of flow for the moisture conducted into said chamber, said moisture path of flow being exposed to circulating air within the food chamber and arranged to present the moisture for absorption by the circulating air, and means for removing excess moisture from the food chamber.

13. A refrigerating apparatus comprising in combination, a cabinet having a lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, means forming an extended path of flow for the moisture conducted into said chamber, said moisture path of flow being exposed to circulating air within the food chamber and arranged to present the moisture for absorption by the circulating air, means for removing excess moisture from the food chamber, and means for evaporating the excess moisture removed from said food chamber into the atmosphere exteriorly of said food chamber.

14. A refrigerating apparatus comprising in combination, a cabinet having a metal lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, said metal lining member having a plurality of corrugations formed therein providing an extended path of flow along a wall of said chamber for the moisture conducted into the chamber, and said moisture path of flow formed by said corrugations being exposed to circulating air within said food chamber and arranged to present the moisture for absorption by the circulating air.

15. A refrigerating apparatus comprising in combination, a cabinet having a metal lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, said metal lining member having a plurality of corrugations formed therein providing an extended path of flow along a wall of said chamber for the moisture conducted into the chamber, said moisture path of flow formed by said corrugations being exposed to circulating air within said food chamber and arranged to present the moisture for absorption by the circulating air, and means for removing excess moisture from the food chamber.

16. A refrigerating apparatus comprising in combination, a cabinet having a metal lining member forming a food storage chamber therein, means for cooling and causing circulation of air within said food chamber, means for precipitating moisture from air exteriorly of said food storage chamber, means for conducting the moisture precipitated from air exteriorly of the food chamber by said second named means into said chamber, said metal lining member having a plurality of corrugations formed therein providing an extended path of flow along a wall of said chamber for the moisture conducted into the chamber, said moisture path of flow formed by said corrugations being exposed to circulating air within said food chamber and arranged to present the moisture for absorption by the circulating air, means for removing excess moisture from the food chamber, and means for evaporating the excess moisture removed from said food chamber into the atmosphere exteriorly of said food chamber.

17. A refrigerating apparatus comprising in combination, a compartment to be cooled, means for cooling and causing circulation of air within said compartment, means for precipitating moisture from air exteriorly of said compartment, means for conducting the moisture precipitated from air exteriorly of the compartment by said second named means into said compartment, and means for distributing the moisture conveyed to the compartment over an extended path of flow into direct contact with air circulating within said compartment.

18. In combination with an apparatus including a compartment to be cooled and located in a room or the like comprising, means for cooling and causing circulation of air within said compartment, means for precipitating moisture from the atmosphere within the room exteriorly of said compartment, and means for conducting the precipitated moisture from said second named means into direct contact with air within said compartment.

19. In combination with an apparatus including a compartment to be cooled and located in a room or the like comprising, means for cooling and causing circulation of air within said compartment, means for precipitating moisture from the atmosphere within the room exteriorly of said compartment, and means for utilizing the precipitated moisture from said second named means for humidifying the air within said compartment.

HARRY B. HULL.